United States Patent [19]

Cykman

[11] Patent Number: 4,862,715
[45] Date of Patent: Sep. 5, 1989

[54] PROTECTIVE CASING AGAINST THEFT OF CAR RADIO SETS

[76] Inventor: Jose Cykman, 1 Harkaby Street, Tel Aviv, Israel

[21] Appl. No.: 308,121

[22] Filed: Feb. 8, 1989

[30] Foreign Application Priority Data

Feb. 23, 1988 [IL] Israel .......................................... 85504

[51] Int. Cl.⁴ .............................................. E05B 73/00
[52] U.S. Cl. ............................................ 70/58; 70/258
[58] Field of Search ............................. 10/58, 57, 258; 248/551, 552, 553

[56] References Cited

U.S. PATENT DOCUMENTS

| 4,066,307 | 1/1978 | Barding | 70/58 |
| 4,072,031 | 2/1978 | Kent | 70/58 |
| 4,082,387 | 4/1978 | Davis | 70/58 |

Primary Examiner—Robert L. Wolfe
Attorney, Agent, or Firm—Ostrolenk, Faber, Gerb & Soffen

[57] ABSTRACT

A protective casing against theft of car radio sets is provided, comprised of front and rear matching sections. Integrally formed with the front casing section is a housing for the body part of a separable padlock. The shackle part of the padlock is protectively housed in an integrally formed extension of the rear casing section. The casing is mountable on the car floor by a U-shaped leg.

7 Claims, 3 Drawing Sheets

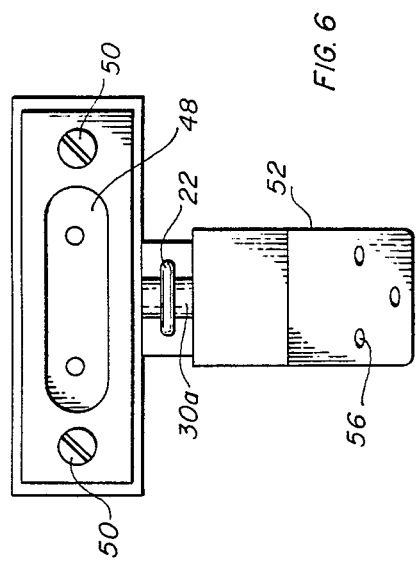
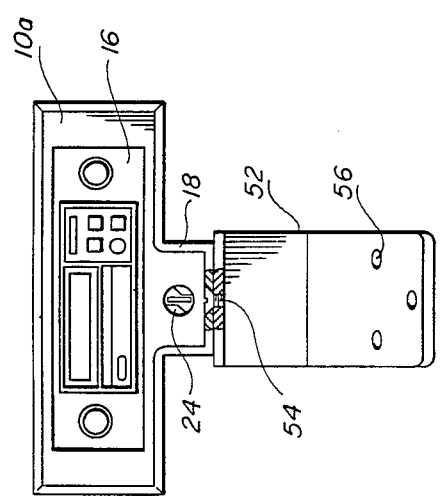

PROTECTIVE CASING AGAINST THEFT OF CAR RADIO SETS

BACKGROUND OF THE INVENTION

The problem of the ever-increasing theft rate of car radio sets, including radio cassette players, has led to various kinds of solutions. Thus, it has been suggested to armour the radio compartment on the car dashboard by a suitable metal frame secured by a suitable lock. Alternatively, arrangements in which the complete radio set is readily removed from the compartment, and carried home upon leaving the car, have also gained some popularity.

SUMMARY OF THE INVENTION

The present invention proposes a car radio set protection, by the provision of a protective casing which comprises a front, hollow, parallelopiped casing section with a partly open front wall which fits around the front panel of the set, and a complementary, rear casing section, dimensioned to enclose the radio set when fitted against the front section. A first housing portion is integrally formed with one of the casing sections, accommodating a body of a key operated separable padlock. A second housing portion is integrally formed with the other of the casing sections, accommodating a shackle of the padlock, in register with the padlock body. A leg is affixed to the bottom of the rear casing section and is adapted to be secured to the floor of the car.

Preferably the first housing portion forms a part of the front casing section, and an opening is formed in a wall common to the front casing section and the first housing portion for the introduction of the padlock body therethrough into the first housing portion. Consequently, the first and the second housing portions are located at the bottom side of the front and rear casing sections, respectively.

The protective casing as a whole is secured to the car floor or other chassis member located beneath the dashboard, between the front seats, by bolts penetrating through the floor, and strengthened by suitable means, rendering burglary of the casing difficult, requiring the use of special tools.

Further details of construction and advantages of the invention will be more fully understood in the light of the ensuing description of a preferred embodiment thereof, given by way of example only with reference to the accompanying drawings.

BRIEF DESCRIPTION OF THE DRAWINGS

FIG. 4 is a front view of the protective casing of FIG. 1;

FIG. 5 is a top view of the casing of FIG. 4; and

FIG. 6 is a rear view of the casing of FIG. 4.

DESCRIPTION OF THE PREFERRED EMBODIMENT

Figure 1:
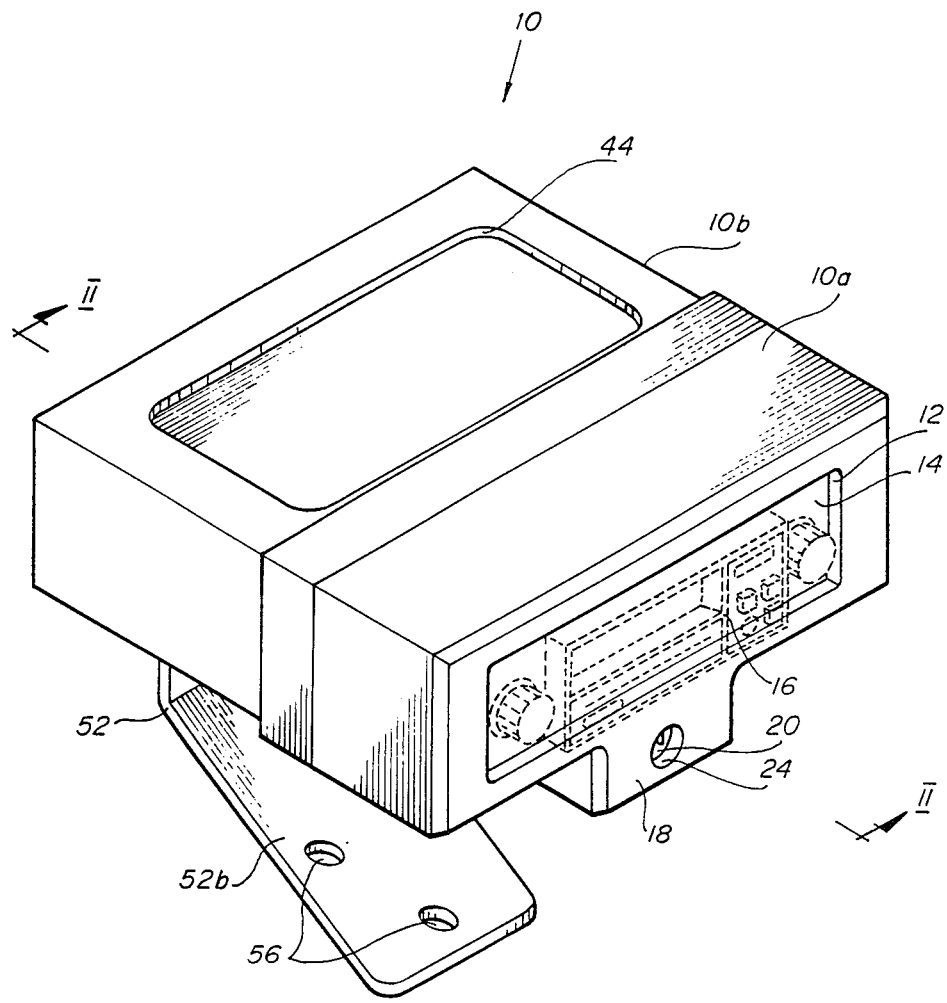
FIG. 1 is a three-dimensional representation of the protective casing provided according to the invention.
Figure 2:
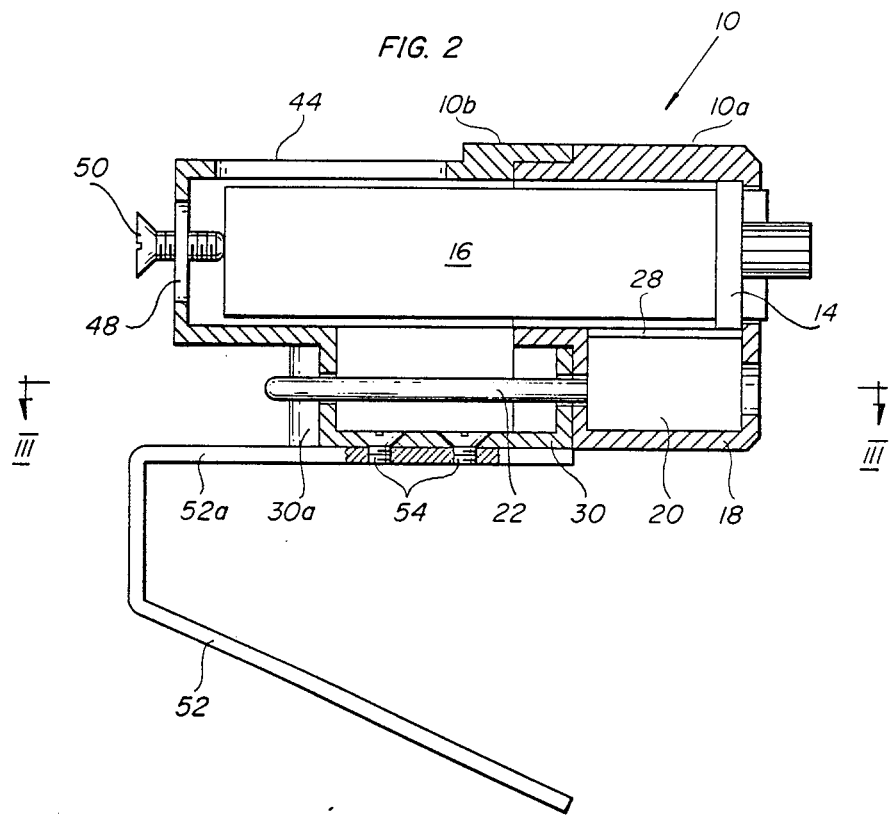
FIG. 2 is a longitudinal section taken along line II—II of FIG. 1.

The car radio set protective casing, generally denoted 10, is divided into two sections, 10a and 10b, and is preferably made of aluminum casting. The front casing section 10a is formed at its front wall with an opening 12, fitting around front panel 14 of radio set 16, as more clearly shown in FIG. 2.

Figure 3:
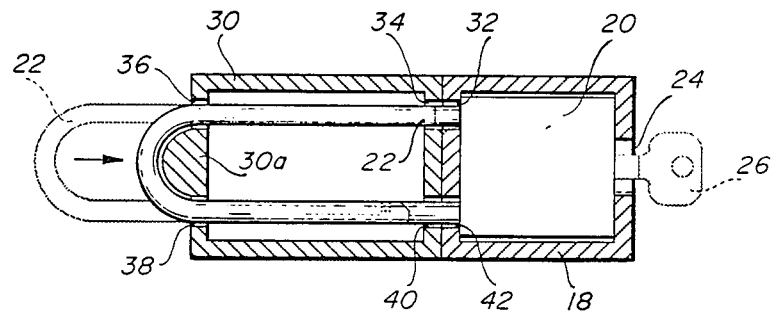
FIG. 3 is a cross-section taken along line III—III of FIG. 2.

Integrally formed with the front casing section 10a, at its bottom, is a housing portion 18. The housing 18 is dimensioned to receive therein body member 20 of a separable padlock, which is associated with a shackle 22. A suitable opening 24 is left for insertion of the padlock key 26 (see FIG. 3). The padlock body 20 is adapted to be inserted into the housing portion 18 from above, namely through a rectangular opening 28, formed between the interiors of the front casing section 10a and the housing portion 18.

Further provided is a rear casing section 10b integrally formed at its bottom side with a second housing portion 30. Suitable series of aligned bores 32, 34 and 36 at the one side, and 38, 40 and 42 at the opposite side, are formed in the various respective parts for the insertion of the padlock shackle 22, as clearly shown in FIG. 3. The rear wall of the housing 30 is preferably provided with a bulging portion 30a that fits the interior curvature of the shackle.

An opening 44 is provided at the top wall of the housing section 10b, for reducing its weight and saving material, on the one hand, and for allowing access to leg mounting bolts 54, as will be explained below. The rear wall of the rear casing section 10b is provided with an opening 48 (FIG. 6), and, in addition, with a pair of adjustment screws 50 for tightening the radio set 16 against the front wall of the front casing section 10a.

A mounting leg or pedestal 52 is provided, of a generally U-shaped configuration (depending on the model of the car), having one arm 52a thereof connected by the bolts 54 to the bottom of the housing portion 30, the other arm 52b thereof sloping down and provided with holes 56, for mounting the protective casing on the floor of the car (not shown).

In use of the protective casing, after being firmly affixed to the car, it is first separated into its front and rear sections 10a and 10b, for insertion of the radio set 16. The padlock shackle is separated from its body 20, as shown in broken lines in FIG. 3. When the radio set is properly installed, with its front panel exposed through the opening 12, the two casing sections are assembled and locked one against the other by the padlock assembly 20-22. The screws 50 are tightened to avoid leeway of the radio within the casing.

By use of the invention, the radio set remains quite conveniently located and easily accessible by the driver, or by the passenger sitting next to the driver, and remains safely nested within its casing.

Many variations may be applied to the embodiment heretofore described. For example, the assembly of the extension housing portions 18 and 30 could be located at one of the sides of the casing 10—or even at its top side—with the leg 52 suitably shaped to reach next to a stiff body or chassis portion of the car. Then, locking means equivalent to the padlock and shackle arrangement may readily be used. Such obvious changes and modifications should be regarded as falling within the scope of the invention as defined in and by the appended claims.

What is claimed is:

1. A protective casing for radio sets comprising
   a front, hollow, parallelopiped casing section with a partly open front wall which fits around the front panel of the set;

a complementary, rear casing section, dimensioned to enclose the radio set when fitted against the front section;

a first housing portion integrally formed with one of the casing sections, accommodating a body of a key operated separable padlock;

a second housing portion integrally formed with the other of the casing sections, accommodating a shackle of the padlock, in register with the padlock body; and a leg affixed to the bottom of the rear casing section, which leg being adapted to be secured to the floor of the car.

2. The casing as claimed in claim 1 wherein the first housing portion forms part of the front casing section, an opening being formed in a wall common to the front casing section and the first housing portion, for the introduction of the padlock body therethrough into the first housing portion.

3. The casing as claimed in claim 2 wherein the first and the second housing portions are located at the bottom side of the front and rear casing sections, respectively.

4. The casing as claimed in claim 3 wherein the leg is generally U-shaped, one arm thereof being fastened to the bottom wall of the second housing portion by screws.

5. The casing as claimed in claim 4 wherein the screws are inserted and tightened through openings formed in the top walls of the rear casing section and of the second housing portion.

6. The casing as claimed in claim 5 wherein means are provided for tightening the radio set against the front wall of the front casing section.

7. The casing as claimed in claim 6 wherein the tightening means comprise adjustment screws provided at the rear wall of the rear casing section.

* * * * *